UNITED STATES PATENT OFFICE.

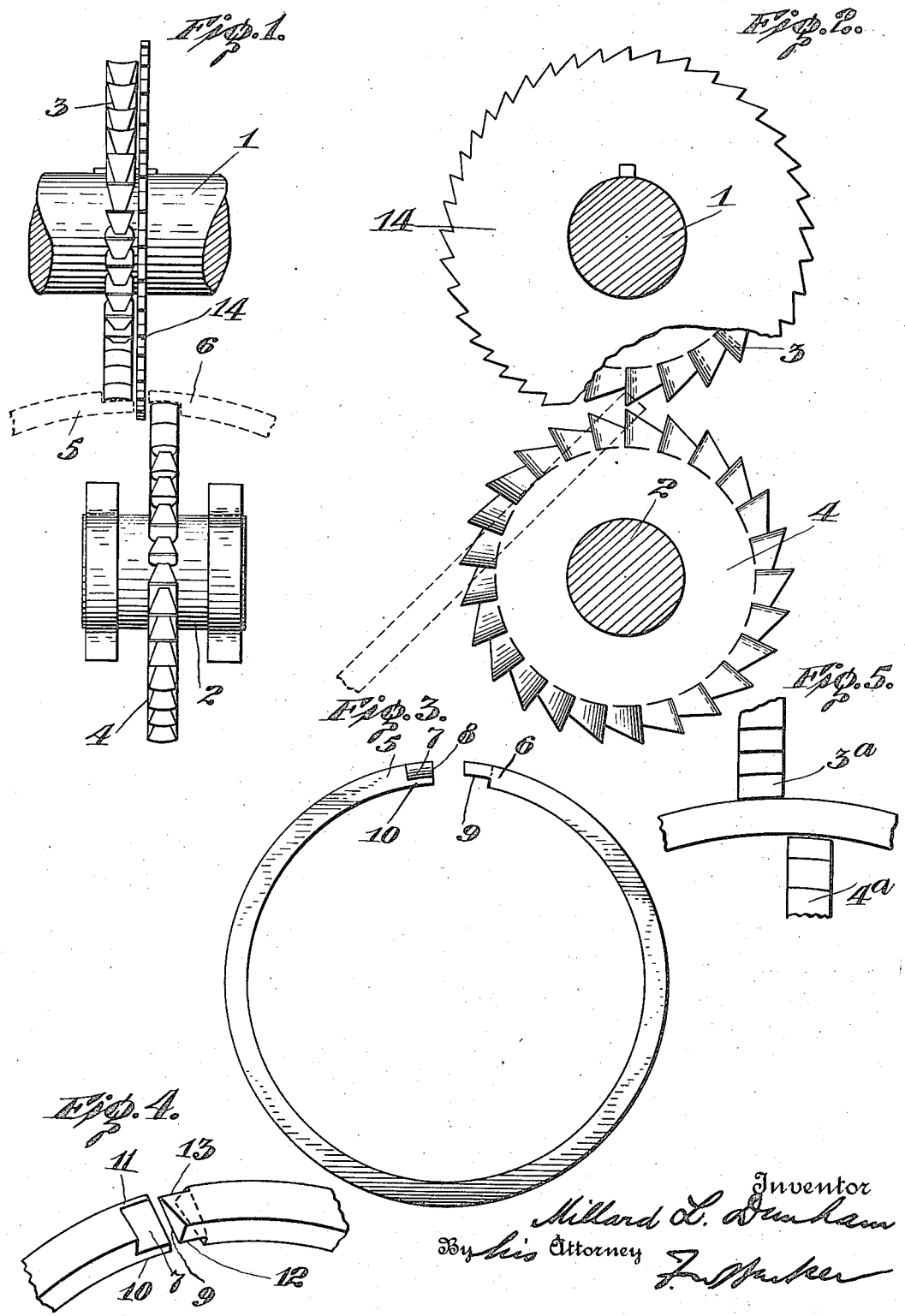

MILLARD L. DUNHAM, OF NEW YORK, N. Y.

APPARATUS FOR PRODUCING LAPPED JOINTS FOR PISTON-RINGS.

1,242,662. Specification of Letters Patent. Patented Oct. 9, 1917.

Application filed October 26, 1916. Serial No. 127,778.

*To all whom it may concern:*

Be it known that I, MILLARD L. DUNHAM, a citizen of the United States, and resident of the borough of Manhattan, in the city, county, and State of New York, have invented certain new and useful Improvements in Apparatus for Producing Lapped Joints for Piston-Rings, of which the following is a specification.

This invention relates to piston rings, and novel apparatus whereby they may be produced, and my improvement has particular reference to a piston ring having a gas tight, sealed joint, and means for creating said joint in a single mechanical operation.

In brief my improvement consists in means for forming angular recesses in the opposed free ends of a divided piston ring, the projecting material of each ring end, where recessed, engaging, respectively, with the opposed recessed portion of the other ring end, and said end portions having opposed curved engaging surfaces to enhance the efficiency and durability of the joint.

The longitudinal seats of the joint are formed at the respective ring ends by cutting away the ring material obliquely at the ends in a transverse direction, whereby, in a ring whose cross section is rectangular, production of the recesses aforesaid leaves terminal portions which are triangular in cross section, and whose hypotenuses represent the meeting faces which comprise the joint.

The mechanical means whereby my improved sealed joint is produced in a single operation, comprises a pair of cutters arranged in a machine to operate upon opposite surfaces of the ring held between them; and in the provision of a circular saw or separating cutter arranged intermediate said oppositely acting cutters. The said cutters and saw, which may be driven at the same time, are so arranged as to simultaneously produce opposite recesses in a continuous ring, and also to cut through and divide said ring between the recessed portions thereof. The faces of the cutters or of the cutter teeth, respectively, may be longitudinally concaved and convexed, that they may impart to the surfaces they act upon in the ring ends like curvatures of engaging character, so that when the ring is contracted in service, the said surfaces may meet in closed gas tight relationship, and so that said surfaces will not acquire separating angles, through wear.

Other features and advantages of my said invention will hereinafter appear.

In the drawing:—

Figure 1 is an elevation of a portion of a machine having two cutters and saw.

Fig. 2 is an end view thereof.

Fig. 3 is a plan view of a ring whose ends have been treated in the apparatus.

Fig. 4 is an enlarged perspective view of a portion of a ring, showing the joint formed therein, and Fig. 5 is a view of a modified form of apparatus.

In carrying out my invention I provide or employ a machine having a pair of parallel shafts, 1, 2, spaced apart, and adapted each to carry a cutter, here indicated, respectively, at 3, 4. The said cutters may be circular in form and provided each with a plurality of teeth, which operate in adjacent, separated, vertical planes.

The arrangement of said cutters, is, in brief, of such character that one of them, as 3, will operate upon one end, as 5, of a divided piston ring; and the other, as 4, will operate upon the other end, as 6, of said ring. The said cutters operate, respectively, upon the upper and lower surfaces of the ring ends, to cut away ring material, and thereby produce recesses in the ring ends which will interfit when the ring is closed.

The faces of the cutters 3, 4, may be curved transversely, as shown in Fig. 1, the cutter 3 having a concave curvature, for example, and the cutter 4 a convex curvature, whereby the cuts or recesses which they produce, respectively, in the opposite surfaces of the ring ends, will have like contours.

The ring to be treated is placed obliquely between the cutters (see Fig. 2) whereby an oblique recess 7 is formed in the end 5, extending from near the inner peripheral surface, at one side, to near the outer peripheral surface, at the other side, leaving said end in the form of a triangular portion whose hypotenuse 8 comprises the outer surface thereof.

The end 4 is reversely formed in like manner, with oblique recess 9, its hypotenuse 8 comprising the inner surface thereof; the surfaces of recesses 7 and 9, when the ring is contracted in use, lying in opposed contact to provide the sealed joint.

By means of the joint described, gas pressures are retained within the combustion chamber of a gas engine without leakage at the joint, because the junction of the oblique surfaces 7 and 9 extends diagonally across the ring section, thereby presenting a complete closure in the ring against the leakage of gas between the ring joint and the piston.

One of the oblique faces, as 7, which is that face lying in opposition to the pressure chamber in the cylinder, terminates at one end on the pressure side 10 of the ring, just within the inner perimeter of the ring, at that side thereof, said oblique face terminating at its other end, on the face of the ring, as at 11, just within the outer perimeter of the ring at its non-pressure side. Thus the oblique face 7, terminates in blunt edges at its opposite sides; the recess, in other words, which is formed in the ring and having oblique face 7, extending less than half way through the ring.

The recess in the other ring end producing the oblique face 9, is formed, on the other hand, to extend more than half way through the material of the ring, resulting in the creation of the knife edges 12 and 13 at the opposite ends of said face 9, which edges 12 and 13 lie, respectively, within the outer perimeter of the ring on its pressure side, and within the inner perimeter of the ring on its non-pressure side.

Thus the knife edges 12 and 13 of the ring end portion bearing oblique face 9, do not extend out to the ring edges, but are seated upon and within oblique face 7, and protected thereby from wear.

To explain clearly the purpose of the differential faces 7 and 9, I will point to the disadvantage which would result in having both said faces terminate in knife edges, that involving a construction difficult of correct accomplishment, and inadvisable on account of the liability to wear with those meeting knife edges forming together a portion of the ring perimeter.

A cutter or circular saw, as 14, may also be included in the apparatus, being mounted on one of the shafts, as 1, to operate between the cutters 3 and 4, and to sever the ring by removal of excess material while the cutters are forming the recesses 7 and 9. Thus the operations of dividing the ring and of forming its ends into a lap joint may be carried out at the same time.

Obviously the arrangement of cutters shown may also be employed for producing rectangular recesses in the ring ends for lap joints.

Further, it is evident that I may dispense with the dividing, or ring separating saw or cutter; instead arranging the recess forming cutters, shown in Fig. 5 at $3^a$, $4^a$, close together, so that when they have cut away the ring material, to form the recesses, the ring will become divided by that operation, and thus capable of compressing to engage the recessed or lapped ends. In this form of my invention the ring which is the product thereof will have no gap between its extreme ends, and consequently, the cutters $3^a$, $4^a$, must be of sufficient width to provide recessed clearances which will permit a sufficient degree of ring contraction for service conditions.

I claim:—

1. An apparatus for producing lap joints in piston rings, the same comprising a pair of cutters mounted to form recesses at opposite sides of a ring, and an intermediate cutter arranged to sever the ring by removal of excess material between the portions thereof in which recesses are formed.

2. An apparatus for producing lap joints in piston rings, the same comprising a pair of cutters, respectively, having concave and convex teeth, to form recesses with curved engaging surfaces at opposite sides of a ring.

3. An apparatus for producing lap joints in piston rings, the same comprising a pair of cutters, respectively having concave and convex teeth, to form recesses with curved surfaces at opposite sides of a ring, and an intermediate cutter arranged to sever the ring by removal of excess material between the portions thereof in which recesses are formed.

Signed at the borough of Manhattan in the city, county and State of New York this 23rd day of October A. D. 1916.

MILLARD L. DUNHAM.

Witnesses:
F. W. BARKER,
L. MOSKOWITZ.